(12) United States Patent
Denoual et al.

(10) Patent No.: US 8,938,440 B2
(45) Date of Patent: Jan. 20, 2015

(54) METHOD AND DEVICE FOR EXTRACTING A META DATA FRAGMENT FROM A METADATA COMPONENT ASSOCIATED WITH MULTIMEDIA DATA

(71) Applicant: Canon Kabushiki Kaisha, Tokyo (JP)

(72) Inventors: Franck Denoual, Saint Domineuc (FR); Nael Ouedraogo, Maure de Bretagne (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 13/774,105

(22) Filed: Feb. 22, 2013

(65) Prior Publication Data

US 2013/0226942 A1  Aug. 29, 2013

(51) Int. Cl.
*G06F 17/30* (2006.01)

(52) U.S. Cl.
CPC ...... *G06F 17/3005* (2013.01); *G06F 17/30023* (2013.01)
USPC ........... 707/706; 707/713; 707/722; 707/736; 707/758; 707/781

(58) Field of Classification Search
CPC ....................................... G06F 17/30
USPC .................................. 707/600–899
See application file for complete search history.

(56) References Cited

U.S. PATENT DOCUMENTS

| 2003/0086409 | A1  | 5/2003 | Karas et al. |
| 2010/0077290 | A1* | 3/2010 | Pueyo ............................ 715/230 |
| 2011/0064387 | A1  | 3/2011 | Mendeloff et al. |

FOREIGN PATENT DOCUMENTS

| AU | 2004202360 A1 | 6/2004 |
| WO | WO2011056139 A1 | 5/2011 |

* cited by examiner

*Primary Examiner* — Isaac M Woo
(74) *Attorney, Agent, or Firm* — Canon U.S.A., Inc., IP Division

(57) ABSTRACT

A method and device for extracting, from a metadata component associated with a media resource, a metadata fragment associated with a given media fragment of the media resource, the method comprising and the device comprising means for obtaining at least one search expression, for finding the metadata fragment in the metadata component, based on the type of extraction parameters related to a request for obtaining the media fragment from the media resource and the structure of metadata component; parameterization of the or each obtained search expression with values based on values of the extraction parameters and extracting from the metadata component the metadata fragment using the or each parameterized search expression.

33 Claims, 6 Drawing Sheets

METHOD AND DEVICE FOR EXTRACTING A META DATA FRAGMENT FROM A METADATA COMPONENT ASSOCIATED WITH MULTIMEDIA DATA

This application claims the benefit under 35 U.S.C. §119 (a)-(d) of United Kingdom Patent Application No. 1203233.0, filed on Feb. 24, 2012 and entitled "A method and device for extracting a metadata fragment from a metadata component associated with multimedia data" The above cited patent application is incorporated herein by reference in its entirety.

The present invention concerns a method and a device for extracting a metadata fragment from a metadata component associated with multimedia data. An exemplary application of the invention relates to the extraction of metadata fragments from XML documents related to a video or other type of multimedia file.

BACKGROUND OF THE INVENTION

The Internet is becoming increasingly exploited by users and consumers for sharing data such as personal photos or videos. Multimedia resources available via the Internet are often associated with metadata. For example a video file may have associated metadata such as subtitles, comments, annotations, ratings etc. An Internet trend, particularly in relation to social networks, is to comment, rank, share and recommend online videos to other users. As a consequence more and more metadata associated with online multimedia data such as videos is generated, made available online and later aggregated with the online multimedia data. Other examples of metadata associated with multimedia data such as video data may include output data provided by object content recognition modules or information obtained from sensors embedded in a video recording device. When retrieving a part of a recorded and analysed video, a user may be interested in obtaining, in addition to the video data, the analysis results for different purposes (augmented display, training, monitoring . . . ).

In 2008, W3C initiated a standardization process in order to specify an addressing scheme based on a uniform resource identifier (URI) mechanism. URI is an addressing scheme for identifying resources on the Internet and also provides features to address sub parts of a resource using what is referred to as a fragment identifier. Based on the fragment identifier, the Media Fragments working group is defining syntax to address specific parts in media resources available on the internet. This syntax is referred to as Media Fragments URI. The specification defines the fragment syntax as well as the communication protocol to enable efficient transmission, between a client and a server, of media subparts that are addressed using the Media Fragments scheme. Indeed, a Media Fragment-aware server will interpret the Media Fragments request and will serve only the relevant part of the resource, thus optimizing the usage of network bandwidth and saving user processing resources. Moreover, this addressing scheme enables requests to be expressed that are independent of the media representation format.

The Media Fragments URI specification defines syntax for addressing specific parts of multimedia resources on the Web. Several kinds of addressing co-exist: temporal, spatial, track or through id.

Temporal addressing relates to time-varying resources such as video or audio streams, for example, and enables a specific time-segment or starting-point in a media resource to be referenced. The following are examples of temporal Media Fragment addressing in a video resource:
http://contentServer/video.mp4#t=10,20
http://contentServer/video.mp4#t=35

The first URI references a temporal segment starting at the tenth second, having a duration of 10 seconds, and extracted from "video.mp4" resource that is located on "content-Server".

The second URI references, for the same video resource, a temporal segment starting at time t=35 seconds (until the end).

Spatial addressing enables a spatial area in a video or in a picture to be referenced. The syntax is simple and specifies position of the top-left corner (x,y) followed by the width and height of the selected area. The following are examples of spatial Media Fragments:
http://contentServer/video.mp4#xywh=45,70, 480, 340
http://contentServer/picture1.jpg#xywh=percent:25,25,50, 50

The first URI references a spatial area from point (45, 70), with a size of 480×340 pixels, extracted from "video.mp4" resource that is located on "contentServer".

The second URI references, for a picture, a spatial area starting at point whose coordinates fall at 25% of original width and 25% of original height with a size of 50% in each dimension compared to the original size.

Track addressing enables one or more tracks to be referenced in the resource as illustrated in the examples below provided that the list of tracks composing the multimedia resource is known.
http://contentServer/movie.mp4#track=video
http://contentServer/
   movie.mp4#track=video&track=audio_fr The first URI references the video track of the resource called "movie.mp4", while the second references both video and audio$_{\_fr\ tracks}$.

id-based addressing enables one to reference a specific part of a multimedia resource that has been a priori indexed. Example:
http://contentServer/
   movie.mp4#id=Georges_kissing_Catherine This URI references a temporal segment of the "movie.mp4" resource, potentially combined with a track selection and/or a spatial area (for example to focus on the characters) that the author has indexed with the identifier: "Georges_kissing_Catherine".

However, applying a URI with the fragment identifier "#" to request so-referenced Media Fragments does not allow the media server to be informed of the specific part that is requested by a user. Indeed, the content of fragment identifier is by definition processed at the user-side since it is not transmitted from the client to the server. As a result the Media Fragments working group defined, in its specification, a transport protocol for Media Fragments request/response, for example on HTTP protocol. This consists in mapping the Media Fragments URI; i.e. the fragment identifier onto the existing HTTP Range header. The client then issues a traditional GET HTTP request to the server with the so-filled Range header to inform the media server of the requested parts in the media resource. Receiving the request, the server then translates the HTTP Range parameters into extraction parameters, for example from time duration 10 seconds to 20 seconds, to perform on the resource. The server then extracts the requested content (or a subset, depending on random accessibility of the resource, or the whole resource if no extraction is possible), sends it back to the client using an HTTP response with a specific new HTTP header: Content- Range-Mapping to indicate what has actually been extracted with its correspondence in byte ranges. This provides an efficient way to exchange pieces of multimedia resources between a client and a server.

For XML metadata, XPath language has been specified by W3C. This language defines syntax for writing queries to extract specific parts of an XML document. XPath 1.0 language defines 4 data and 7 node types. XPath syntax also defines a grammar for building expressions that will be applied to an XML document in order to extract parts of interest. XPath expressions can be gathered into 2 categories as follows:

1. <<Navigation Expressions>>:

These are expressions returning as an evaluation result an ordered set of nodes: essentially LocationPath and Steps that correspond to the specification of a path to resolve into a tree representation of an XML document.

2. <<Computation Expressions>>:
   a. Expressions returning a Boolean: OrExpr, AndExpr, RelativeExpr, EqualityExpr.
   b. Expressions returning a number: AdditiveExpr, MultiplicativeExpr.
   c. Expressions returning any kind of type: FilterExpr and FunctionCall.

In order to be able to extract an XML fragment from an XML document, at the time of writing of the XPath expression the content of the XML document should be known. This can be achieved by knowledge of XML schema information or by means of a user interface displaying the structure of the document so that a user can select parts of interests.

The Media Fragments URI techniques discussed above do not however focus on metadata addressing, except when metadata is embedded into the media resource and reachable via #track addressing. Metadata distinct from the media resource is the most common case on the Internet.

Moreover, considering the variety of metadata and user generated content on the internet that may be related to a video file for example (e.g. comments, ratings, annotations, subtitles etc.) an XPath technique alone is not sufficient to extract Media Fragments from metadata documents since XPath techniques do not enable "blind" addressing (i.e. without knowledge about the document organization).

When a user requests specific parts of a video or multimedia presentation from an online server, it would be desirable to be able to filter the metadata associated with the video or multimedia data by extracting only the relevant parts that correspond to the requested part in the video or multimedia presentation. This would avoid the transmission of useless information over the network and would limit the buffering requirements at the client-side.

SUMMARY OF THE INVENTION

The present invention has been devised to address one or more of the foregoing concerns.

According to a first aspect of the invention there is provided a method of extracting, from a metadata component associated with a media resource, a metadata fragment associated with a given media fragment of the media resource, the method comprising: obtaining at least one search expression, for finding the metadata fragment in the metadata component, based on the type of extraction parameters related to a request for obtaining the media fragment from the media resource and the structure of metadata component; parameterization of the or each obtained search expression with values based on values of the extraction parameters and extracting from the metadata component the metadata fragment using the or each parameterized search expression.

Thus, a user performing a request for one or more media fragments of a media resource may also be provided with access to corresponding metadata fragments. This enables only the relevant part of the metadata to be transferred to the user's device thereby reducing the amount of data to be transferred and optimising usage of network bandwidth.

The type of search criteria corresponds to the type of access to the multimedia resource. For example the search criteria may comprise a spatial search criterion for obtaining multimedia data of the multimedia resource corresponding to a specific spatial zone of the multimedia resource and/or a temporal search criterion for obtaining multimedia data of the multimedia resource corresponding to a specific time duration.

The method may include determining the structure of the metadata component in the case where the format of the metadata component is not identified.

Embodiments of the invention thus provide an inference module that analyzes metadata documents in order to associate parameterize-able XPath expressions with each declared metadata document.

Determining the structure of the metadata component comprises analysing the metadata component to verify the presence of one or more pre-defined keywords.

In an embodiment of the invention the parameterised search expressions are mapped to the metadata component. Thus the format identification step (to determine the structure of metadata component) may be omitted thereby optimising the extraction process.

In an embodiment the pre-defined keywords are based on the extraction parameters for obtaining the media fragment In an embodiment it is determined if the or each pre-defined keyword is present as an attribute or an element in the metadata component.

In an embodiment determining the structure of the metadata component comprises detecting the presence of one or more keyword values.

The method may include a step of determining a further keyword for the at least one search expression based on a detected formatted value.

The further keyword may be mapped to the structure of the metadata component, and stored.

In an embodiment, the further keyword stored replaces a least used predefined keyword previously stored.

The method may include determining a respective generic search expression for the or each parameterised search expression for future use in extracting metadata fragments from metadata components of the same type by replacing the parameter values with generic parameters.

In an embodiment, the generic search expressions are mapped to the type of metadata component and stored.

In an embodiment, the step of detecting the presence of one or more keyword values is performed as an optional background task when the metadata component is not time dependent.

In one embodiment in the case of multiple extraction parameter types the first most discriminant keywords are considered before they least discriminant ones.

A second aspect of the invention relates to a method of delivering a metadata fragment from a metadata component associated with a media resource, the method comprising the steps of:

receiving a request for a media fragment of said media file;
extracting the metadata fragment from the metadata component using a method according to the first aspect of the invention wherein the parameters representative of the media fragment are obtained from the media fragment request; and delivering the extracted metadata fragment. The media fragment may be delivered with the requested media fragment.

In embodiments of the invention the metadata component is defined in XML and the or each search expression comprises an XPath expression.

A third aspect of the invention provides a device for extracting, from a metadata component associated with a media resource, a metadata fragment associated with a given media fragment of the media resource, the device comprising:

means for obtaining at least one search expression, for finding the metadata fragment in the metadata component, based on the type of extraction parameters related to a request for obtaining the media fragment from the media resource and the structure of metadata component;

means for parameterization of the or each obtained search expression with values based on values of the extraction parameters and means for extracting from the metadata component the metadata fragment using the or each parameterized search expression.

A fourth aspect of the invention provides a device for delivering a metadata fragment from a metadata component associated with a media resource, the device comprising:

means for receiving a request for a media fragment of said media resource;

means for extracting the metadata fragment from the metadata component using a device according to claim 18 wherein the parameters representative of the media fragment are obtained from the media fragment request; and means for delivering the extracted metadata fragment.

The device may be provided with means for performing the method according to the various embodiments of the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:—

DETAILED DESCRIPTION OF THE INVENTION

Figure 1:
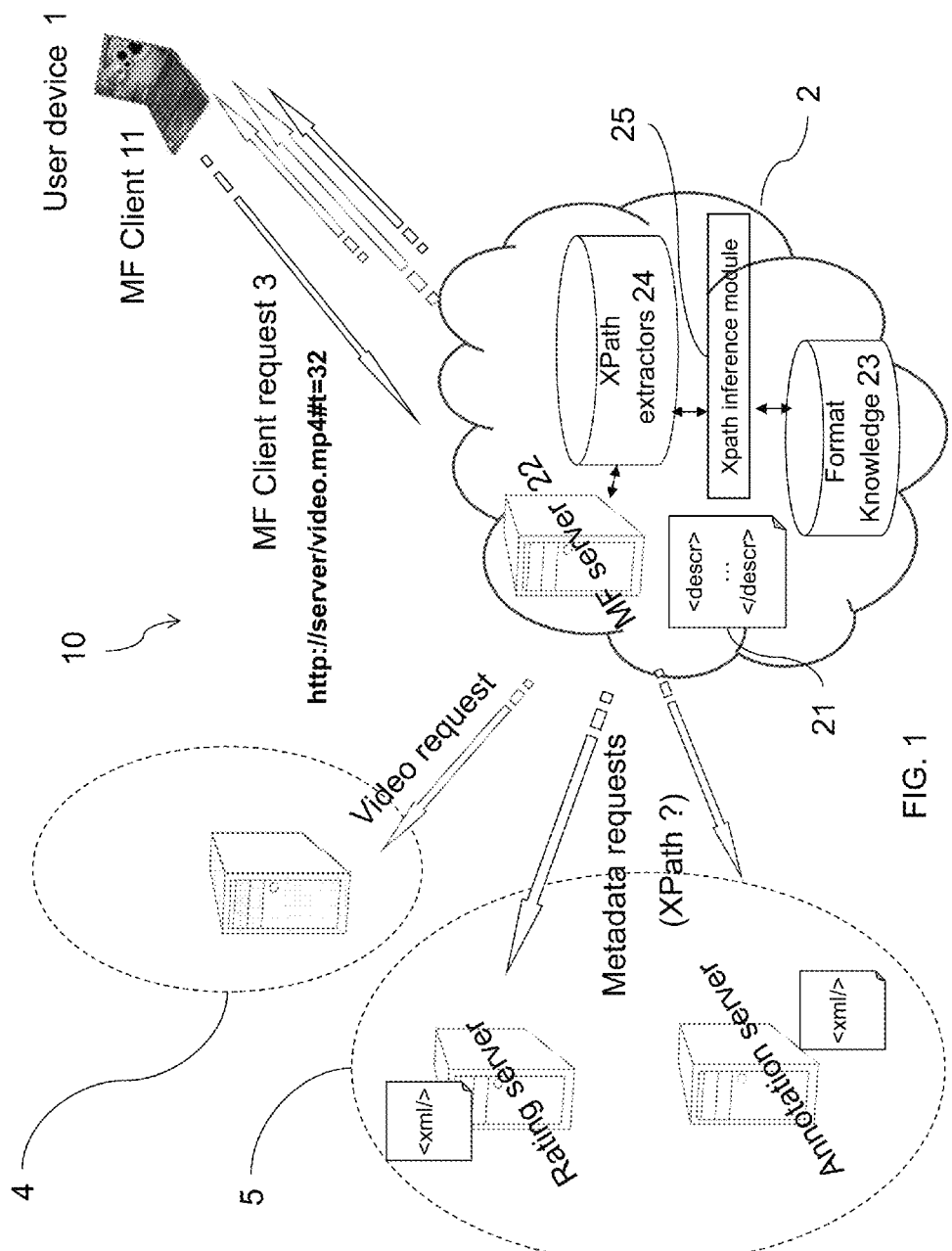
FIG. 1 is a schematic diagram of a communication network in which one or more embodiments of the invention may be implemented.

FIG. 1 illustrates a data communication system in which one or more embodiments of the invention may be implemented. The data communication system 10 comprises a user terminal device 11 connected to an application server system 2 by means of a data communication network. The application server system 2 is configured to provide a network media sharing service, for example a video sharing service, and is connected to at least one media resource provider server 4 and at least one metadata provider server 5 by a data communication network.

The application server system 2 may, for example, be implemented as an accessible cloud service. The application server system 2 is configured to manage user requests, for media data and/or metadata, received from one or more user terminal devices. In order to handle requests, the application server accesses description files 21 that list the available video contents and their related resources such as metadata including user annotations, ranking, and/or related videos and the like. These description files 21 are used to show users the available data contents that the user can select and interact with. The data content is provided by various video provider servers 4 and metadata provider servers 5. The application server system 2 may retrieve data content manually by means of an application administrator or automatically by crawling the Web for annotation services 5 or for feeds from video publishers 4.

A user, by means of user terminal device 1, can select data content for browsing and can navigate to the selected data content through hyperlinks. The user device 1 includes an embedded Media Fragments client device 11 for translating each navigation request into a Media Fragments request 3 for transmission to the application server system 2. In addition to navigation, the user can indicate the application from which he is interested in obtaining additional data. Some of the additional data may be displayed on video data thus requiring fast response from the application server system 2. Other data may be used to fill parts of the presentation page layout and may be less critical in terms of response time.

The application server device system 2 contains a Media Fragments server device 22 that is configured to process users' requests 3 to access specific parts (temporal, spatial) of a media resource such as a video. The media fragments server device is connected to a database of XPath extractors 24 which is connected to a format knowledge database 23 via an XPath inference module 25.

The user terminal device 1 and the application server 2 may have a priori (at connection start-up for example) agreed on rich content browsing (i.e. obtaining information related to selected videos). In such a case, the Media Fragments server device 22 translates the user's request 3 into an appropriate request to be applied to the metadata provider servers 5 for retrieval of metadata Moreover, the choice of whether or not to retrieve metadata content associated with a media resource has an impact on the behaviour (trade-off search/response time) of the XPath inference module 25.

To perform the request translation, the Media Fragments server 22 accesses 2 databases. The first database is a format knowledge data base 23 storing information/keywords on existing metadata formats plus default keywords; and the second is an XPath extractors database 24 storing already defined XPath expressions.

It will be appreciated that embodiments of the invention is not limited to the described Media Fragments addressing protocol. Any addressing protocol between the user device 1 and the application server system 2 that enables specification of a search type with bound values in a media resource may also be used. For example, the MPEG-21 Part-17 standard also provides a URI-based addressing scheme. Typically, a URL such as
http://www.example.com/myfile.mp4#mp(~time('npt', '0', '60')) defines a temporal access into "myfile.mp4". Another candidate could be the RESTful URL used by Microsoft Smooth streaming clients; ex:
http://servercom/video.manifest/Fragments
(video=610275114) where 610275114 is the start offset expressed in an agreed-upon time unit (usually 100 nanoseconds (ns)).

Figure 2:
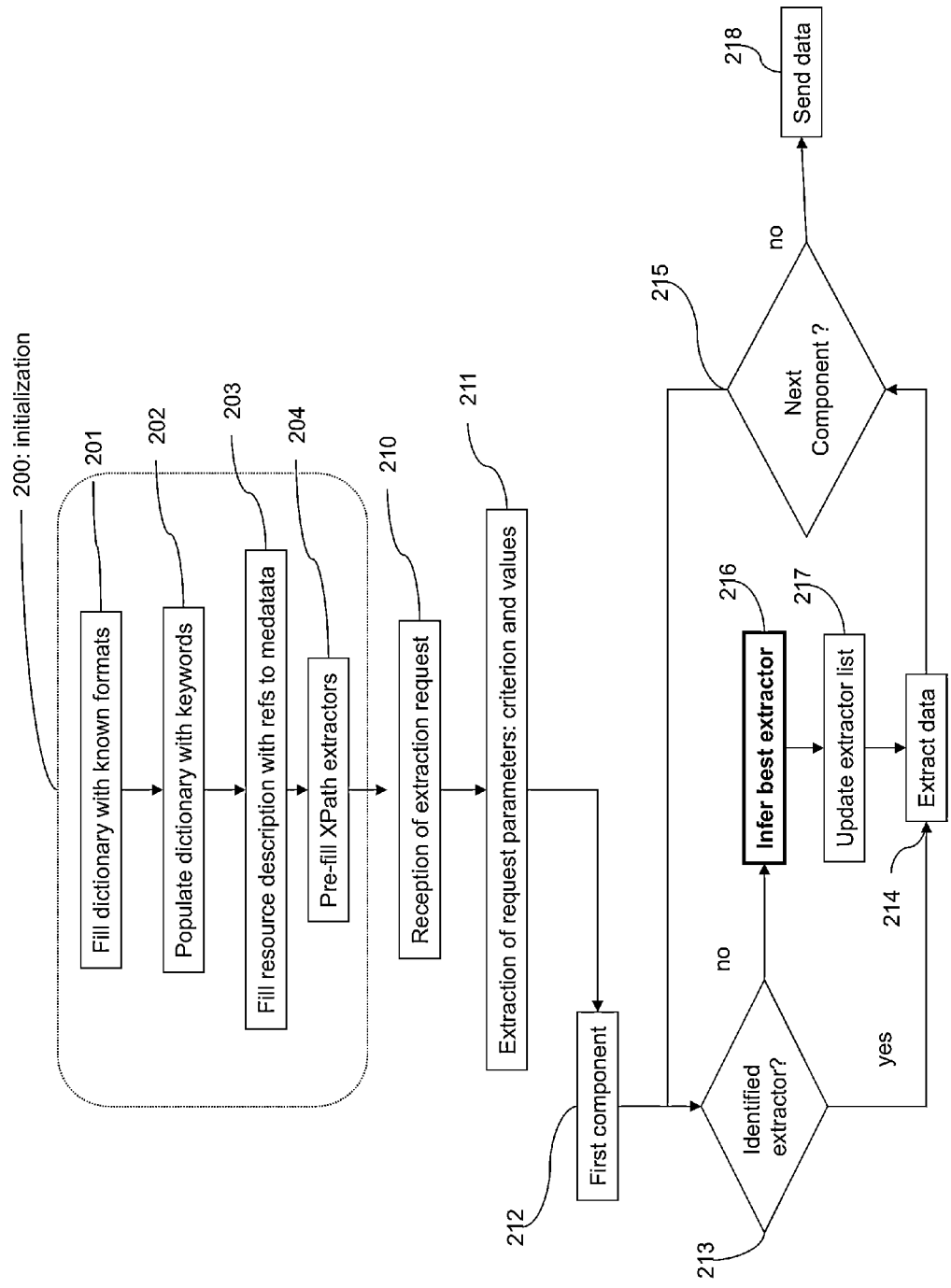
FIG. 2 is a flow chart illustrating steps of a method of extracting, from a metadata component associated with a media resource, a metadata fragment associated with a given media fragment of the media resource, according to an embodiment of the invention

A method of extracting, from a metadata component associated with a media resource, a metadata fragment associated with a given media fragment of the media resource, according to an embodiment of the invention will now be described with reference to the flow chart of FIG. 2. The described method may be implemented in the system of FIG. 1 to extract a metadata fragment associated with a media resource such as a video.

The method begins with an initialization step 200. In step 201 information on commonly used metadata formats are stored in the format knowledge database 23.

The organization of the format knowledge database 23 will be described in more detail with reference to FIG. 3.

Figure 3:
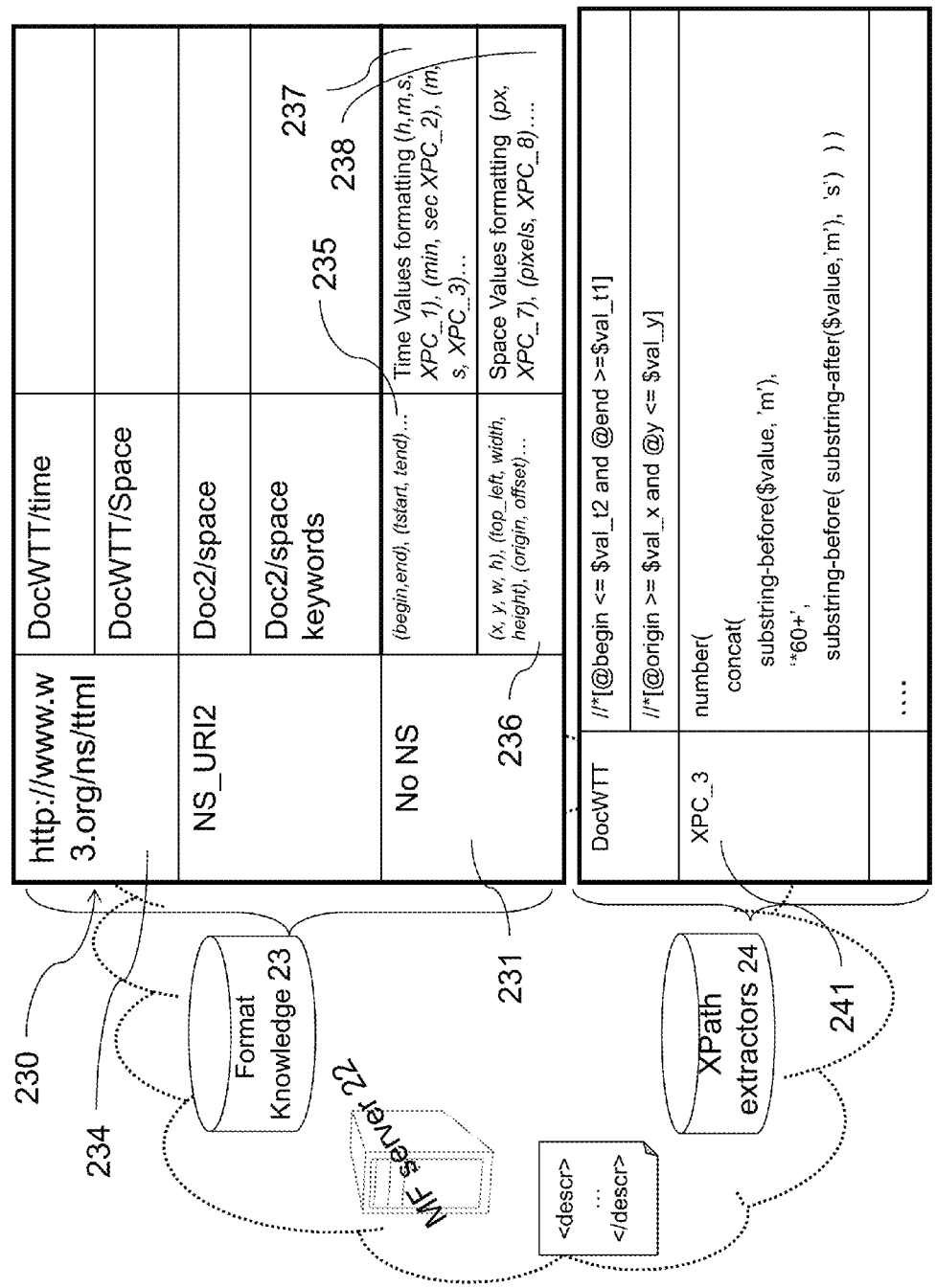
FIG. 3 is a schematic block diagram of an example of data tables stored in databases of embodiments of the invention.

FIG. 3 presents two data tables: one for the format knowledge database 23, another for storing a list of associations: (document, XPath expressions) for the XPath extractors database 24.

The data table of the format knowledge database 23 is populated with information taken from existing metadata formats that provide time and space organized information on video content, like for example MPEG-7, W3C or 3GPP Timed Text, tracks in MXF. An entry in the format knowledge table is created for each known format.

As an example in FIG. 3, row 230 of the format knowledge table 23 is filled with W3C Timed Text information 234: first the namespace identifying W3C Timed Text (http://www.w3.org/ns/ttml) is stored. This namespace makes it possible to directly pre-fill the XPath extractors database 24 with search expressions relevant for known standards as detailed below. However, keywords/tag-names can still be extracted from standard formats to populate keywords dictionary in step 202 in order to be used when no standard format is identified. This corresponds for example to line 231 of the format knowledge database 23.

The last line 231 contains the list of keywords to look for when no standard format is identified (i.e. there is no registered namespace in the format knowledge database 23). These keywords are preferably derived from already registered standard formats and stored respectively in 235 and 236 for time and space information. Thus, when the format is not identified a first attempt is made to use pre-defined keywords derived from the standard formats. These pre-defined keywords correspond to 235 and 236 in line 231.

Keywords/tag-names can correspond to timing information (or type) (for example: "begin", "end", "dur", corresponding respectfully to a start time, an end time and a time duration) and to space information (origin, extent).

For the last line 231 in the table of format knowledge database 23 and for each type of access (time 235, space 236), information associated with value formatting is also stored (237, 238). For example, W3C Timed Text specifies that time values must follow a given syntax. The syntax elements (one or more ":" characters, "h" "m" "s" "ms" "f" "t" units) are then stored as predefined value format keywords to later infer on possible time values. This is the same for space values where a "px" unit appears: "px" is then stored as a pre-defined value format keyword to identify space information values formatting. This process contributes to the population of a keywords dictionary in step 202.

Step 203 involves associating, in the resource description files 21, a media file such as a video with references to metadata files, for example through a list of URIs or a list of feeds. In step 204, the XPath extractors database 24 can be pre-filled for metadata files compliant with known standards. As an example, if for one video the description file (21) contains references to a W3C Timed Text document, this document can be associated with the XPath extractors associated with the W3C Timed Text documents registered in first lines of the XPath extractor's database table 24. After step 204, the application server is then ready to process requests from a user's device.

An extraction request is received at the application server system 2 in step 210. The received request identifies a video selected by the user through a URI: e.g.: http://www.appserver.com/video_2#t=12,20. The Media Fragments Server 22 of the application server system 2 extracts, in step 211, the request parameters: search dimensions (time in the above example) plus associated bound values (12, 20 in the above example). When the transport protocol in use is HTTP, this information can be retrieved simply by parsing the Range header information. In step 212, the Media Fragments Server 22 parses the part of a description file 21 corresponding to the selected video. There may be one or more related metadata documents associated with the selected video (annotations, comments, technical data . . . ). Processing includes attempting to identify and extract relevant information from each of them one after the other. This process starts at step 212 with the first component (or metadata document related to the video). If it is determined in step 213 that there is already an extractor registered for this type of document, then the Media Fragments server 22 only has to apply that extractor in step 214 to the document in order to extract the relevant data. It may be noted that for metadata documents compliant with standards known by the application server system 2, extractors may have been registered a priori in the XPath extractor database 24 in step 204.

Figure 4:
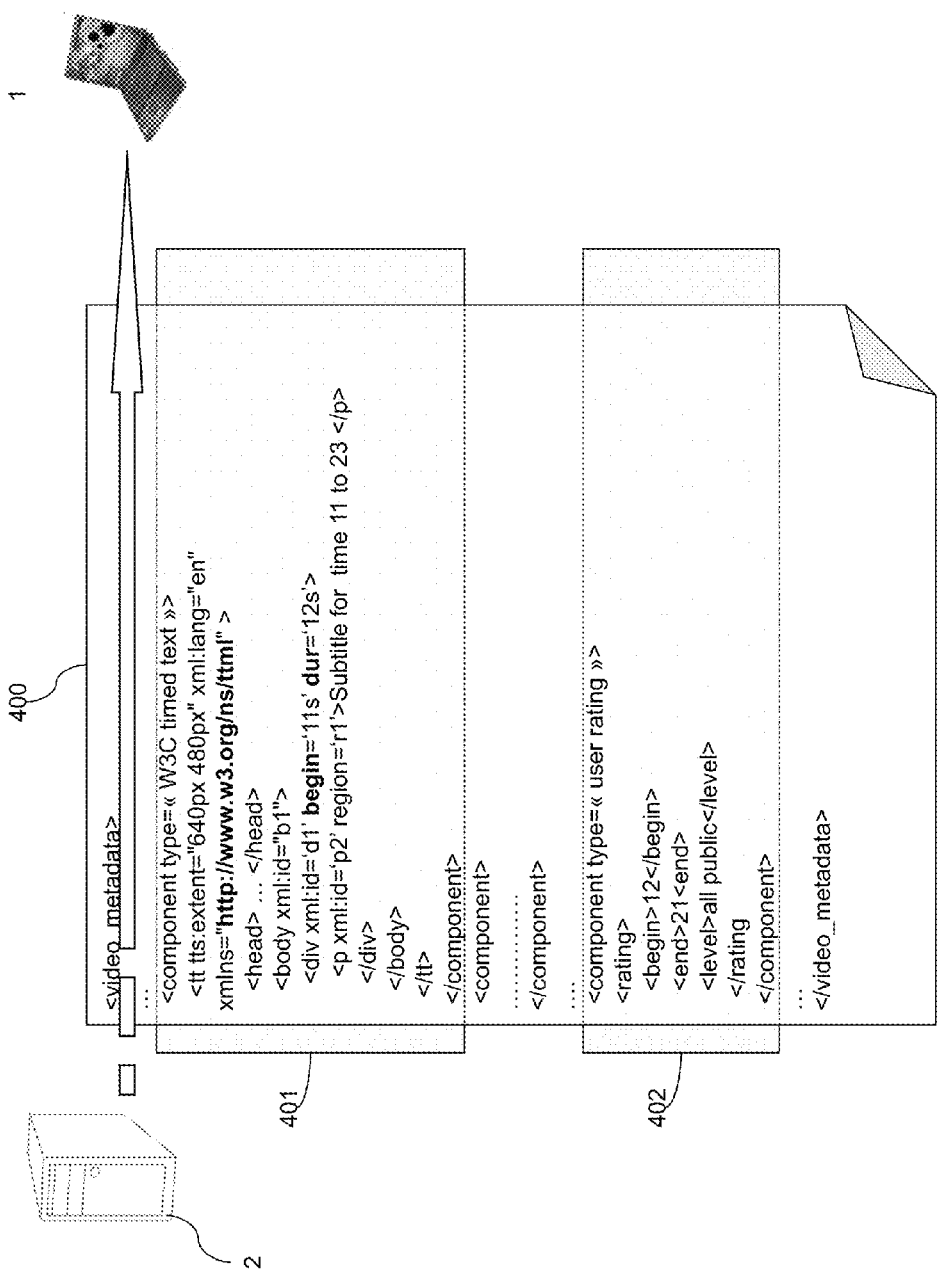
FIG. 4 is a an example of data sent to a user device from an application server of an embodiment of the invention.

The Media Fragments server 22 then iterates over any other metadata components indicated in the description file 21 in step 215. In the case where no extractor is identified in step 213, the inference step 216 for inferring the most suitable extractor, is performed. The inference step 216 is performed by the XPath inference module 25 of the application server system 2 and will be described in further detail in what follows. In step 217 the XPath extractor list is updated by adding a new XPath extractor definition to the XPath extractor database 24 of the application server 2. The Media Fragments server 22 then iterates until no further metadata component is to be processed for the current video (step 215 false) and thus sends the response to the user request, formatted in an XML message as illustrated in FIG. 4, to the user terminal device 1.

The response 400 is transmitted from the application server system 2 to the user terminal device 1 via HTTP. The metadata represented by the response 400 can be for example part of an HTTP multipart message with the first part of the body corresponding to the requested video fragment (specified in the Media Fragments client request). In the example of FIG. 4, different metadata components matching the requested time interval (t=12,20) are presented: part 401 is an XML fragment providing sub titles, part 402 includes user data providing rating information. It will be appreciated that the surrounding XML syntax around the metadata "components" is provided here as an example and could be any video metadata standards covering these kind of applications or a dedicated application format. In the extractor list update step 217, for the current metadata component, a new input is created in the XPath extractor table of database 24 and the XPath expressions that produced results for the given query are recorded. Before recording the results and to be generic, specific values of variables are removed and replaced by parameters using XPath variables.

It will be appreciated that a metadata component may include a metadata document such as an XML document representing metadata associated with a media resource such as a video or multimedia presentation thus representing a component of the said media resource.

Figure 5:
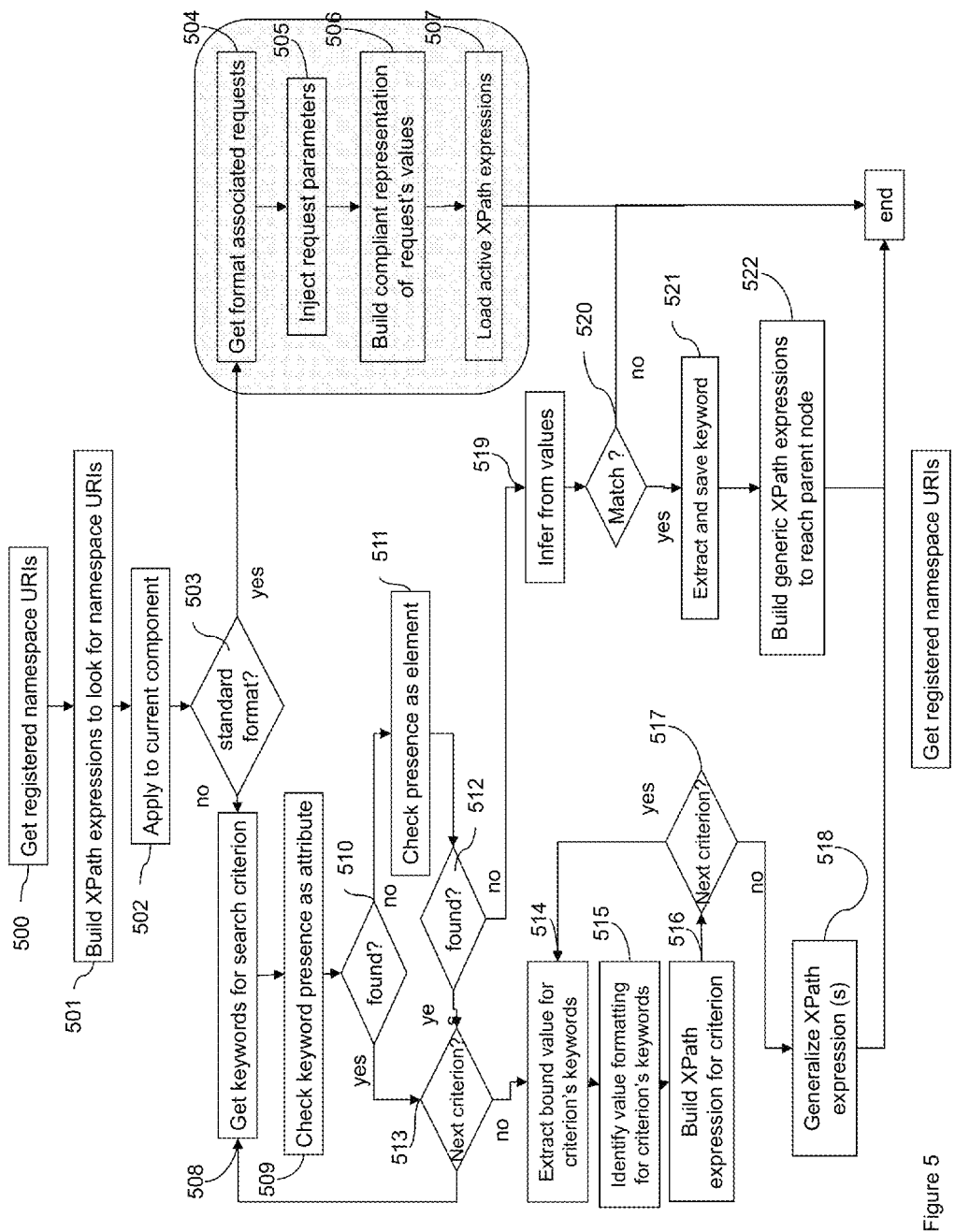
FIG. 5 is a flow chart illustrating steps of a method of inferring an XPath expression for extracting a metadata component according to an embodiment of the invention.

Operation of XPath inference module of the application server system 2 will now be described with reference to FIG. 5. Different sets of XPath expressions are used to respectively infer on document format, structure and/or values. FIG. 5 is a flow chart illustrating steps of a method for inferring at least one XPath expression for extracting a metadata fragment from a metadata document in accordance with an embodiment of the invention.

An initial step of the method entails checking the format of the metadata document. In order to check this, a first set of XPath requests is applied to the current metadata document. In step 500, the XPath inference module 25 obtains the registered namespace definitions from the format knowledge database 23. In step 501 the XPath expressions are formed as follows: for example, each namespace definition leads to an XPath expression of type:

Expression to check presence of a registered namespace URI:

$$\text{namespace-uri}(/*)=\$NS\_URI \text{ or namespace-uri}(/*/*)=\$NS\_URI \quad (1)$$

$NS_URI is an XPath value reference for representing the current namespace URI value to be tested that is registered in the format knowledge database 23. This limits the exploration of the metadata document to a depth level of 2 (the XML metadata document being structured into elements and values, each element having a depth level corresponding to its position in a tree representation of the document (root node having depth=0)) which provides a good trade-off between complexity and the likelihood of getting the most relevant namespace declarations. When the XPath value reference is applied to the current metadata document in step 502, evaluation of the XPath expression enables it to be determined as to whether or not the metadata document complies with a metadata standard format in step 503. If a standard format is identified (test 503 true), this format then provides the entry format in the XPath extractors table of database 24. Different XPath expressions are then registered in association with this entry format in step 504, depending on the type of user's request, for example: spatial or temporal access to the video data. Parameters of the user's request for the media fragment are provided by the Media Fragments server 22 in step 505 and indicate the appropriate XPath expressions to be considered (step 506) with the range values to be considered (typically a start time and an end time for temporal access). Once filled with user's requests parameters, the XPath expressions to be applied to the current metadata component are loaded into the Media Fragments server in step 507 in view of their evaluation in step 214 of FIG. 2. Optionally, in update step 217 of FIG. 2 which follows step 507, an entry can be created in the data table of XPath extractors database 24 to map the current metadata document (using a unique identifier also inserted into description file 21) to the appropriate XPath expression, in order to avoid the previously described format identification step.

For document structure inference, in the case where no format has been identified in step 503, i.e. the metadata document provides no information on its organization or vocabulary in use, the XPath inference procedure proceeds to step 508 where an inference is made on structure and/or values of the metadata document. For that, the XPath inference module 25 uses the list of keywords registered in row 231 of the format knowledge table of data base 23 to obtain keywords according to the user's request for the media fragment. A trial and error type procedure is then performed: keywords are organized into search categories, for example temporal vs. spatial and within these categories the keywords are organized into start parameters and end parameters. For example, for a start parameter of a temporal access, several potential keywords may be available: t_start, start, tstart, time_beg, begin, t1, .... Moreover, the keywords can occur as attributes or elements. It is initially checked as to whether the metadata document contains at least one of these keywords, step 509, starts looking at attribute position using the following expression:

Expression for obtaining the first attribute with local-name "keyword":

$$(/*//attribute::keyword)[1] \quad (2)$$

Then, if it is determined in test step 510 that no result is found for the keyword as an attribute the XPath inference engine 25 retries in step 511 with the same keyword regarded this time as an element, using the expression below:

Expression to get the first element with local-name "keyword":

$$(//keyword)[1] \quad (3)$$

These 2 expressions both enable (for some optimized XPath implementations) the process to be immediately stopped once a first attribute or element with the name "keyword" is found. This thus limits the search time.

If the keyword is found as an element in test step 512 the XPath inference engine interrupts the keyword list and jumps to the next request criterion in step 513, for example, a request criterion such as an end value or a duration for the temporal request. The corresponding list of keywords is then iterated as previously described until no further match is obtained or no further request criterion is to be processed.

Advantageously, to save exploration time, the XPath inference process can use, from one request criterion to another, the structural information obtained from previous search; i.e. when the start parameter for a criterion is located on an attribute, there is a high likelihood that the end parameter will also fall on an attribute. Then, XPath inference engine 25 can use this information to start a more relevant search between steps 509 and 511 and even limit the search to one of the two steps 509 or 511 i.e. attribute or element. The above steps enable verification of the presence and identification of the relevant keywords (test 513 true) or an indication that none of the keywords is present in the metadata document (test 512 false). In each case, the next step is to infer on document values.

For inference of document values two cases may be distinguished: a first case in which information on structure is available (test 513 false) and a second case when no information on structure has been deduced from the previous step (test 512 false). In the first case, the XPath inference process proceeds to step 514 in order to directly perform the extraction/filtering of the metadata document. In the second case, the XPath inference module 25 infers on values in step 519 in order to potentially detect timing or positioning information. This part can be activated when the user does not play with the application in the most reactive mode. Indeed, value inference can be more costly than structure inference, thus value interference could be used in a background process for future requests or when the request applies to non-time-critical metadata (e.g.: metadata that are not display overlaid for visual effects, but rather are additional static/textual information in relation to the media resource). Such metadata classification may, in some embodiments of the invention, be performed on the application server and provided to the user GUI. By selecting some of the metadata to receive along with the corresponding video data, the user then indicates to the application server the types of metadata that he is interested in.

The next step then involves setting parameters of the user's request as bounds on the detected keywords value. For example, given the user's request http://www.appserver.com/video_2#t=12,20, and assuming detected keywords $t_{13}$ start and $t_{13}$ end are found as attributes, then the inference module builds up the following expression:

Expression to compare value with criterion bounds:

$$//*[@t\_start<=20 \text{ and } @t\_end>=12] \tag{4}$$

However, this is the case when values are not formatted. If we consider for example the W3C Timed Text format, it can be seen that time values called "timeExpression" are formatted according to a normative syntax. This is why a preliminary step is used to perform a joint inference/validation of the values for the search dimension. First the value for the identified keyword of the first search criterion is extracted in step 514, using one of the expressions below, depending on the results of step 509 and 511 i.e. whether it is an attribute or element:

Expressions to get the first value for a given criterion's keyword:

$$(//keyword)[1]/text() \tag{5}$$

$$(/*//attribute::keyword)[1]/text() \tag{6}$$

Next in step 515 the value extracted in step 514 is analysed: for each registered value format information in the format knowledge database table 23, the XPath inference module 25 checks whether or not pre-defined value format keywords (237 for time (temporal) value formatting and 238 for space (spatial) value formatting) are present in the extracted value in the same step 515. This corresponds to verifying as to whether or not the formatting of the extracted value of the identified (pre-defined) keyword is compliant with the type of said keyword; the verifying is done for example by first detecting the presence of one or more pre-defined value format keywords in the value of the pre-defined keyword and then checking whether pre-defined value format keywords that are detected as being present correspond to the type of the pre-defined keyword.

For example, a time value may be formatted using a combination of "min" and "sec" pre-defined value format keywords. The pre-defined value format keywords "min" and "sec" are for example compliant with the type time of "t_start" and "t_end" pre-defined keywords. To detect whether this combination of keywords is used, the XPath inference applies XPath expressions such as:

Expression to check the formatting of a value for a bound of a criterion's keyword:

$$contains(\$value, \text{`sec'}) \text{ and } contains(\$value, \text{`min'}) \tag{7}$$

Where $value corresponds to the value extracted in step 514. If the expression returns true indicating that this combination of keywords is used, then exploration of the format knowledge table in database 23 can be stopped, otherwise the process proceeds to the next combination of keywords until a matching one is found. Associated with each value format keyword are XPath expressions for conversion ("XPC" as illustrated in FIG. 3, 241) of formatted values into numbers so that the extraction can be simply expressed as a numerical comparison. These conversion expressions can be used to transform the value obtained from expressions (5) or (6) into t_start and t_end parameters of expression (4). When the format value has been identified for all bounds of all search criteria (test 517 false), then the XPath inference module (25) has succeeded in defining one or more XPath expressions to reach data matching the user's request. The final step 518 is then to generalize the set of XPath expressions so that that set can be applied to similar requests with any bound values. As an example, expression 4 above would become:

Abstract expression to reach data matching one criterion:

$$//*[@t\_start<=\$bound\_1 \text{ and } @t\_end>=\$bound\ 2] \tag{8}$$

With bound_1 and bound_2 extracted from the user's request by the

Media Fragments server 22 of the application server system 2 and t_start and t_end being the results of conversion functions from the XPath extractor table of database 24. This is this set of generalized expressions that is registered in the XPath extractor table of database 24 for future access and filtering of the current metadata document. This will avoid the need to apply inference steps and will provide a faster response time in metadata filtering.

For an update of format knowledge in a specific case where no information can be inferred from the metadata document structure (test 512 false), if the user interaction with the applications server system 2 does not require a rapid response, the XPath inference engine can perform a deeper analysis in step 519 of the values using the format knowledge table of database 23 and as explained for the steps 514 to 517. If a value matches the formatting (test 520 true), the parent element or parent attribute node may be a potential keyword and is then appended into the last line of format knowledge table 23 in association with current search criterion/dimension.

More generally, this corresponds to verifying whether the formatting of the values associated with non-defined keywords (i.e. no information can be inferred directly from them) correspond to one or more pre-defined value format keywords (formatting match), and if the value formatting corresponds to one or more pre-defined value format keywords, storing the non-defined keyword as a pre-defined keyword in the format knowledge table 23.

Optionally, the insertion in table 23 can be associated with the removal of the least accessed keywords so that keyword search time does not increase and so that the size of the table 23 remains stable. This is done in step 521. The last step 522 consists in building the one or more generic XPath expressions to reach the parent of the values that matched at step 520.

When the user's request contains several search directions (ex: spatial+temporal), an additional step can be inserted after step 513 in the inference on structure. This additional step would include a loop on each search direction to check at which depth the matching keywords have been found in steps 509 or 510. Indeed, if a keyword for one search direction is detected on an attribute rather than on an element, or when the keyword is found at lower depth, it is potentially more discriminative than another keyword. Being more discriminative means that a matching metadata fragment can be detected without having to deeply parse the metadata document and thus the detection of the matching metadata fragment is faster. Thus, it is interesting as another embodiment to have the detected keywords ranked according to their "discriminant" power or level while inferring on a document, so that the resulting XPath expressions are built starting with sub-expressions considering most discriminant keywords and then subsequent sub-expressions considering the less discriminant keywords. By doing so, the metadata extraction will be more simple (reduced load of the XPath processor) thus reducing the response time of the application server 2.

Considering temporal and/or spatial access to video or multimedia presentation, embodiments of the invention provide a generic (i.e. without prior knowledge of the metadata files organization (index, DTD, XML schema . . . )) solution for identifying and extracting the metadata fragments that are relevant for the requested part of the video or multimedia presentation.

The general principle of the described embodiments involves applying the Media Fragments requests for a video or a multimedia presentation to associated metadata via a translation of these requests into a set of XPath expressions. The set of XPath expressions to apply on metadata depends on the type of access that is made into the video (mainly temporal or spatial) and auto-adjusts to the metadata documents organization.

In this way the embodiments of the invention provide a solution for efficiently extracting XML metadata fragments of relevance according to temporal and/or spatial access to media resources such as video or multimedia presentation, thus reducing the amount of information exchanged between for example a client and a server.

Figure 6:
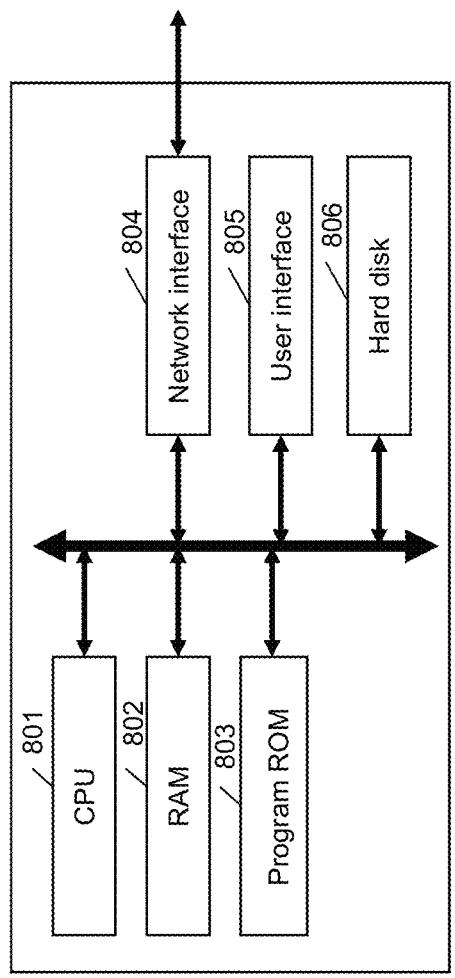
FIG. 6 is a functional block diagram of a device for determining search expressions for extracting, from a metadata component associated with a media resource, a metadata fragment associated with a given media fragment of the media resource, according to an embodiment of the invention.

FIG. 6 is a functional block diagram of an XPath inference module of FIG. 1, according to an embodiment of the invention.

The device 800 comprises a central processing unit (CPU) 801 capable of executing instructions from program ROM 803 on powering up of the device 800, and instructions relating to a software application from a main memory 802 after powering up of the device 800. The main memory 802 may be for example of a Random Access Memory (RAM) type which functions as a working area of the CPU 801, and the memory capacity thereof can be expanded by an optional RAM connected to an expansion port (not illustrated). Instructions relating to the software application may be loaded into the main memory 802 from a hard-disc (HD) 806 or the program ROM 803 for example. Such a software application, when executed by the CPU 801, causes the steps of the method of embodiments of the invention, for example as illustrated in FIG. 5, to be performed on the device.

The device 800 further includes a network interface 804 enabling connection of the device 800 to the communication network. The software application when executed by the CPU is adapted to receive data streams through the network interface 804 from other devices connected to the communication network in the case of a receiving device and to transmit data streams through the network interface 804 in the case of a transmitting device.

The device 800 further comprises an operator interface 805 to display information to, and/or receive inputs from an operator where appropriate.

Embodiments of the invention also provide some additional benefits such as a query system that is independent of metadata format, and an auto-learning and evolving system: when new metadata are linked to a media resource, inference is performed and relevant requests are stored.

Although the present invention has been described hereinabove with reference to specific embodiments, the present invention is not limited to the specific embodiments, and modifications will be apparent to a skilled person in the art which lie within the scope of the present invention.

For instance, while in the foregoing examples have been described with reference to video data, methods of embodiments of the invention may be applied to other types of media resources.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of extracting, from a metadata component associated with a media resource, a metadata fragment associated with a given media fragment of the media resource, the method comprising:

obtaining at least one search expression, for finding the metadata fragment in the metadata component, based on the type of extraction parameters related to a request for obtaining the media fragment from the media resource and the structure of metadata component;

parameterization of the or each obtained search expression with values based on values of the extraction parameters; and extracting from the metadata component the metadata fragment using the or each parameterized search expression.

2. A method according to claim 1 wherein the type of extraction parameters comprises spatial extraction parameters for obtaining multimedia data of the multimedia resource corresponding to a specific spatial zone of the multimedia resource and/or temporal extraction parameters for obtaining multimedia data of the multimedia resource corresponding to a specific time segment of the multimedia resource.

3. A method according to claim 1 further comprising determining the structure of the metadata component in the case where the format of the metadata component is not identified.

4. A method according to claim 3 wherein determining the structure of the metadata component comprises analysing the metadata component to verify the presence of one or more pre-defined keywords.

5. A method according to claim 4 wherein the pre-defined keywords are based on the extraction parameters for obtaining the media fragment.

6. A method according to claim 4 wherein it is determined if the or each pre-defined keyword is present as an attribute or an element in the metadata component.

7. A method according to claim 4 wherein if the analysing of the metadata component indicates the presence of a pre-defined keyword, the method further comprises verifying whether the formatting of the pre-defined keyword value is compliant with the type of said pre-defined keyword.

8. A method according to claim 7, wherein the verifying step comprises:
   detecting the presence of one or more pre-defined value format keywords in the value of the pre-defined keyword; and
   checking whether any pre-defined value format keywords that is detected as being present corresponds to the type of the pre-defined keyword.

9. A method according to claim 4 wherein if the analysing of the metadata component indicates the presence of a non pre-defined keyword, the method further comprises verifying whether the formatting of the non-defined keyword value corresponds to one or more pre-defined value format keywords, and if the value formatting corresponds to one or more pre-defined value format keywords, storing the non-defined keyword as a pre-defined keyword.

10. A method according to claim 9 wherein the steps of verifying and storing are performed as background task.

11. A method according to claim 9 wherein the keyword stored replaces a less used predefined keyword previously stored.

12. A method according to claim 11 wherein the generic search expressions are mapped to the type of metadata component and stored.

13. A method according to claim 4 wherein in case of multiple extraction parameter types, more discriminative keywords are considered before less discriminative keywords.

14. A method according to claim 1 comprising determining a respective generic search expression for the or each parameterised search expression for future use in extracting metadata fragments from metadata components of the same type by replacing the parameter values with generic parameters.

15. A method of delivering a metadata fragment from a metadata component associated with a media resource, the method comprising:
   receiving a request for a media fragment of said media resource;
   extracting the metadata fragment from the metadata component using a method according to claim 1 wherein the parameters representative of the media fragment are based on the media fragment request; and
   delivering the extracted metadata fragment.

16. A method according to claim 1 wherein the metadata component is defined in XML and the or each search expression comprise an XPath expression.

17. A computer program product for a programmable apparatus, the computer program product comprising a sequence of instructions for implementing a method according to claim 1 when loaded into and executed by the programmable apparatus.

18. A computer-readable storage medium storing instructions of a computer program for implementing a method, according to claim 1.

19. A device for extracting, from a metadata component associated with a media resource, a metadata fragment associated with a given media fragment of the media resource, the device comprising:
   a search expression module for obtaining at least one search expression, for finding the metadata fragment in the metadata component, based on the type of extraction parameters related to a request for obtaining the media fragment from the media resource and the structure of metadata component;
   a parameterization module for parameterization of the or each obtained search expression with values based on values of the extraction parameters; and
   an extractor for extracting from the metadata component the metadata fragment using the or each parameterized search expression.

20. A device according to claim 19 wherein the type of extraction parameters comprises spatial extraction parameters for obtaining multimedia data of the multimedia resource corresponding to a specific spatial zone of the multimedia resource and/or temporal extraction parameters for obtaining multimedia data of the multimedia resource corresponding to a specific time segment of the multimedia resource.

21. A device according to claim 19, further comprising a structure determining module for determining the structure of the metadata component in the case where the format of the metadata component is not identified.

22. A device according to claim 21, wherein the structure determining module is configured to determine the structure of the metadata component by analysing the metadata component to verify the presence of one or more pre-defined keywords.

23. A device according to claim 22, wherein the pre-defined keywords are based on the extraction parameters for obtaining the media fragment.

24. A device according to claim 22, wherein the structure determining module is configured to determine if the or each pre-defined keyword is present as an attribute or an element in the metadata component.

25. A device according to claim 22 wherein the structure determining module is further configured to verify whether the formatting of the pre-defined keyword value of a detected pre-defined keyword is compliant with the type of said pre-defined keyword.

26. A device according to claim 25 wherein the structure determining module is further configured to detect the presence of one or more pre-defined value format keywords in the value of the pre-defined keyword; and to check whether any pre-defined value format keyword that is detected as being present corresponds to the type of the pre-defined keyword.

27. A device according to claim 22 wherein the structure determining module is further configured to verify whether the formatting of a detected non-defined keyword value corresponds to one or more pre-defined value format keywords, and if the value formatting corresponds to one or more pre-defined value format keywords, to store the non-defined keyword as a pre-defined keyword.

28. A device according to claim 27 wherein the structure determining module is configured to perform the steps of verifying and storing as background tasks.

29. A device according to claim 27, wherein the further keyword stored replaces a less used predefined keyword previously stored.

30. A device according to claim 22 wherein in the case of multiple extraction parameter types, more discriminative keywords are considered before less discriminative keywords.

31. A device according to claim 19 further comprising a generic search expression module for determining a respective generic search expression for the or each parameterised search expression for future use in extracting metadata fragments from metadata components of the same type by replacing the parameter values with generic parameters.

32. A device according to claim 31 further comprising a mapping module for mapping the generic search expressions to the type of metadata component and storing the generic search expressions.

33. A device for delivering a metadata fragment from a metadata component associated with a media resource, the device comprising:
- a receiver for receiving a request for a media fragment of said media resource;
- an extractor for extracting the metadata fragment from the metadata component using a device according to claim 19 wherein the parameters representative of the media fragment are obtained from the media fragment request; and
- a module for delivering the extracted metadata fragment.

* * * * *